United States Patent [19]
Wright, Jr.

[11] Patent Number: 5,671,051
[45] Date of Patent: Sep. 23, 1997

[54] HELICOPTER BLADE TRACKING SYSTEM

[76] Inventor: Andrew M. Wright, Jr., 2071 Rites La., N. Palm Beach, Fla. 33408

[21] Appl. No.: 101,547

[22] Filed: Aug. 2, 1993

[51] Int. Cl.$^6$ .................................................. G01B 11/00
[52] U.S. Cl. .............................. 356/372; 356/23; 73/455
[58] Field of Search ........................ 356/372, 23, 399, 356/138, 153; 73/66, 455, 466, 655; 244/17.11; 416/144, 145

[56] References Cited

U.S. PATENT DOCUMENTS

| | | |
|---|---|---|
| 2,552,739 | 5/1951 | Roberts . |
| 2,669,120 | 2/1954 | Jensen et al. . |
| 2,759,359 | 8/1956 | Jensen et al. . |
| 2,964,849 | 12/1960 | Roccati . |
| 2,970,367 | 2/1961 | Crump . |
| 3,008,525 | 11/1961 | Jensen . |
| 3,515,485 | 6/1970 | Frank . |
| 3,802,273 | 4/1974 | Helmuth et al. . |
| 4,465,367 | 8/1984 | Sabatier . |
| 4,531,408 | 7/1985 | Chadwick et al. ................... 73/455 |

*Primary Examiner*—Hoa Q. Pham
*Attorney, Agent, or Firm*—Jack N. McCarthy

[57] ABSTRACT

A helicopter blade tracking system including an apparatus and method having a self-contained light unit on each blade; each light unit being of similar construction and matched in size and weight. Rings of light formed by the light units during blade rotation are observed by the operator during hover and blade angular position is changed to bring the rings of light into one multi-colored ring of light.

16 Claims, 2 Drawing Sheets

HELICOPTER BLADE TRACKING SYSTEM

TECHNICAL FIELD

This invention relates to the basic maintenance of the helicopter. The helicopter requires adjustment of the rotor blades to maintain the blade tips of all of the blades following the same rotative path, called tracking.

BACKGROUND OF THE INVENTION

Blades have been tracked by the use of a tracking flag which is placed at the outer edge of a rotating blade so that a marking device on a blade tip can place a mark on the flag indicating its heighth from a ground reference. Further, targets have been used on the tips of the blades and viewed by optical devices. Patents related to these methods are: U.S. Pat. Nos. 2,552,739; 2,669,120; 2,759,359; 2,964,849; 2,970,367; 3,008,525; 3,515,485; 3,802,273; 4,465,367; and French Patent No. 1,446,960.

DISCLOSURE OF INVENTION

It is an object of this invention to provide a tracking system for helicopter blades which can be easily operated by one person with the helicopter in flight, or at a hover.

Another object of this invention is to have a matched set of self-contained light units to provide for easy installation on, and removal from, the tips of the helicopter blades. The tracking using this system should be done in a low-light location, such as evening, or in a hangar having controlled lighting to permit a low light. This permits easier viewing of the tracking lights.

A further object of this invention is to provide a tracking system which does not require complicated sighting instruments in the cockpit.

Another object of this invention is to have each self-contained light unit including a mounting bracket having one upwardly directed face connected to a rotor blade, while another face is directed radially inwardly down the length of the blade towards the cockpit. A bulb is mounted on this radially directed face, along with an on-off switch; the unit includes the circuitry necessary to operate the bulb.

A further object of this invention is to provide a set of self-contained light units which are matched in size and weight, with different colored lights, so that one self-contained light unit can be placed on each blade being tracked. These lights will provide a ring of light to indicate the path of a blade; if the rings of light of the different lights form one multi-colored ring of light, then the blades are "in track". If one or more rings of light of a separate color appears, then an adjustment of the pitch control link of the blade having that colored light must be made.

BRIEF DESCRIPTION OF DRAWINGS

FIG. 5 is a fragmentary view of a rotor head showing the connection of an adjustable pitch control link between a pilot's control rod and its rotor blade.

BEST MODE FOR CARRYING OUT THE INVENTION

Figure 1:
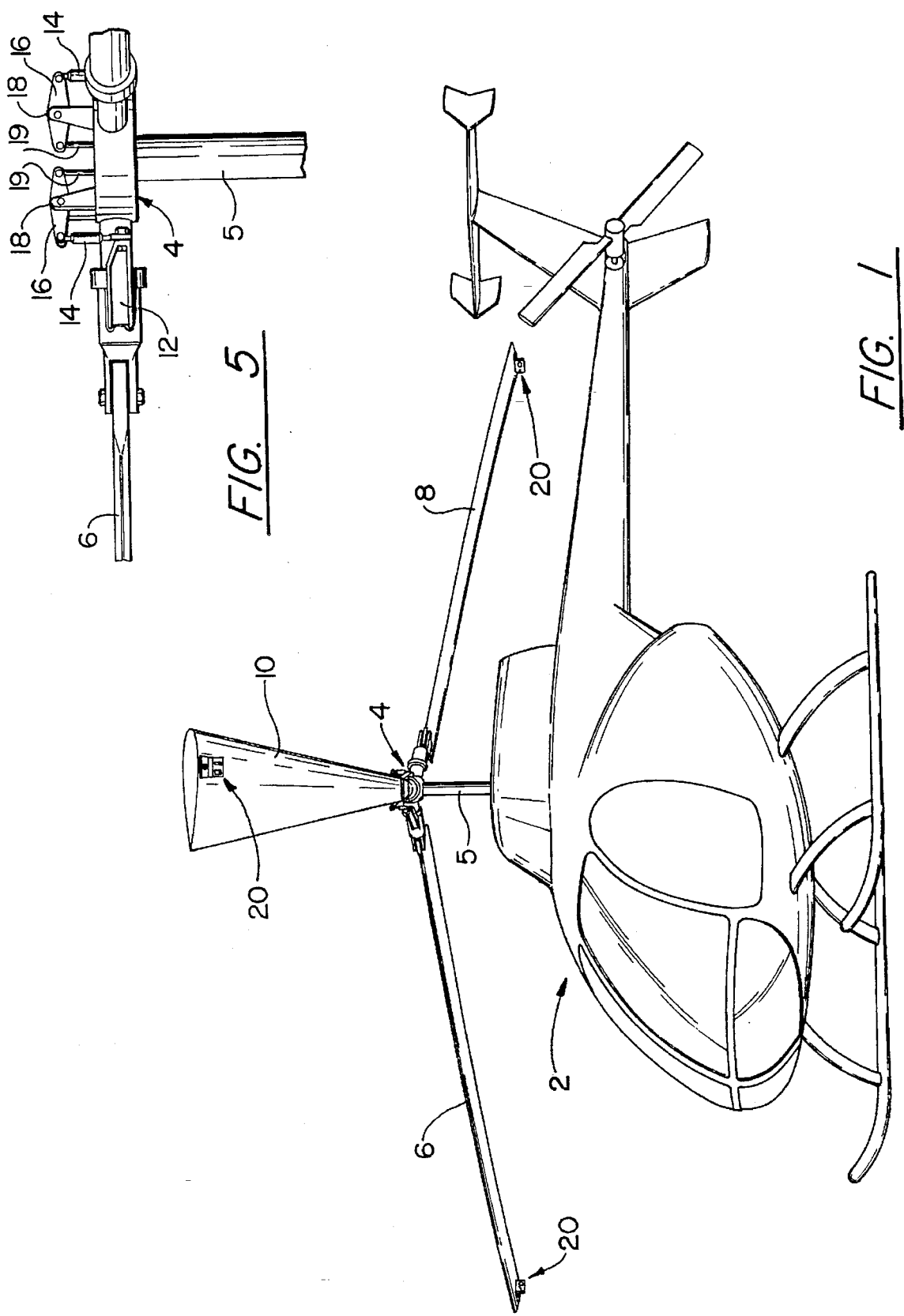
FIG. 1 is a perspective view of a three-bladed helicopter having a self-contained light unit at the free end of each blade.
Figure 2:
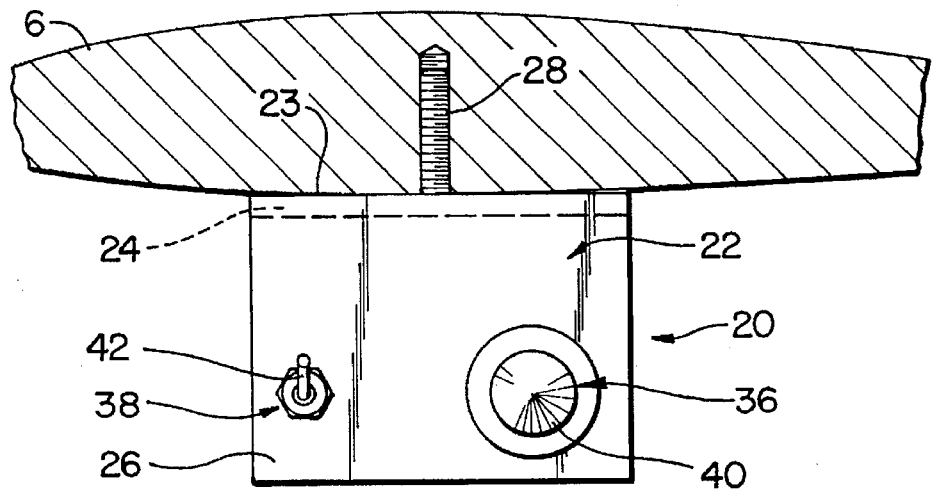
FIG. 2 is a front view of the self-contained light unit taken from the inner end of the helicopter blade.

In FIG. 1, a three-bladed helicopter 2 is shown with conventional operating controls. The rotor head 4 to which the rotor blades 6, 8, and 10 are each attached for pivotal movement about its longitudinal axis can be one of many known types, such as shown in U.S. Pat. No. 2,759,359; U.S. Pat. No. 3,802,273; or U.S. Pat. No. 3,008,525. Rotor head 4 is attached to a hollow rotor shaft 5 which is in turn connected to an engine in the helicopter 2. Each blade has an extending arm, or horn, 12, adjacent its inner end to pivot the blade about its longitudinal axis. An adjustable pitch control link 14 connects the free end of each extending arm 12 to one end of a rocker arm 16. Each rocker arm 16 is pivoted at a mid-point to the rotor head 4 on an upstanding bracket 18 fixed to the rotor head 4. The other end of each rocker arm 16 is connected to a pilot's control rod 19 which extends through the hollow rotor shaft 5 to the pilot's compartment by means well known in the art. It can be seen that as a control rod 19 is held fixed, movement of the adjustable link 14 to change its length will pivot the attached blade about its longitudinal axis.

Adjusting a pitch control link 14 provides for changing the length of the link 14 and therefore the angle of the connected blade with respect to the remainder of the blades. Each blade 6, 8 and 10 must be at a proper angle to achieve proper tracking of the blades in rotation. Blades can go out of track many ways, some happening during operation. After maintenance has been performed on the helicopter, such as a blade replacement, the blades may need to be placed in track.

To achieve proper blade tracking, a matched set of self-contained light units 20 of the same construction are provided. The self-contained light units 20 are matched by size and weight, to provide the proper balance on the rotating blades.

Figure 3:
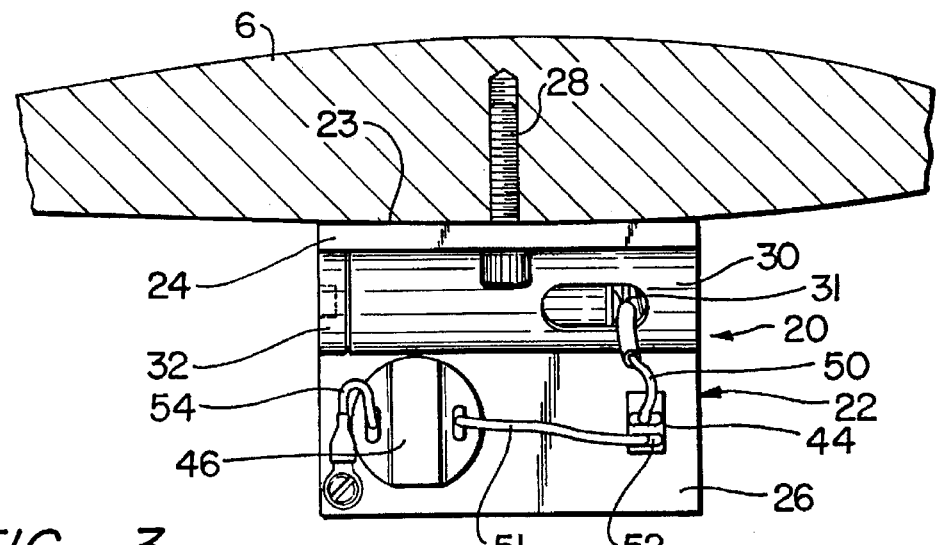
FIG. 3 is a rear view of the self-contained light unit taken from the outer end of the helicopter blade.
Figure 4:
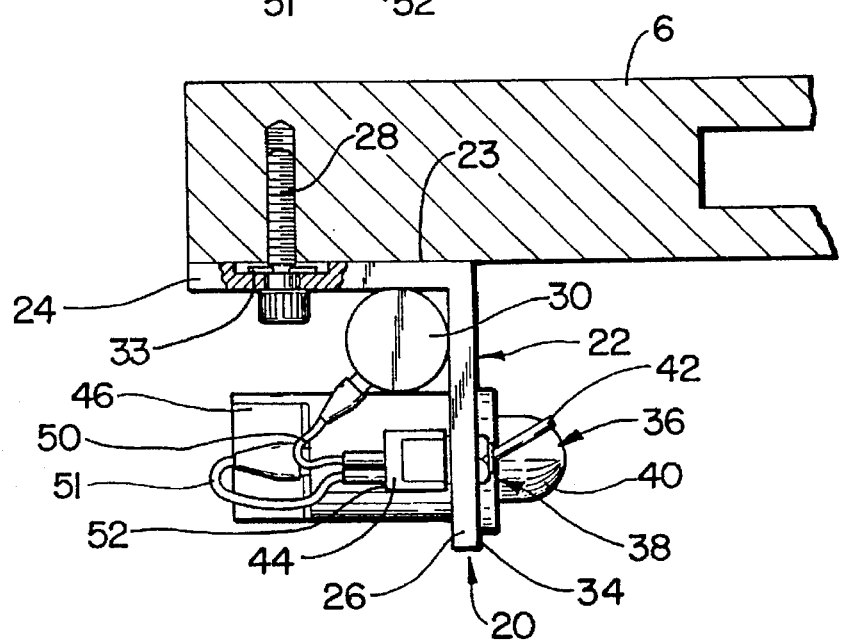
FIG. 4 is a side view of the self-contained light unit mounted on a helicopter blade.

Each self-contained light unit 20 comprises a two-sided angle-shaped housing 22 which has the outer surface 23 of one of the sides 24 arranged to be placed against the bottom surface of a rotor blade while the other side 26 extends downwardly from the blade. The outer side 26 has its outer surface 34 facing inwardly along the longitudinal axis of the blade. A threaded bolt 28 extends through said flange side 24 and fixes the self-contained light unit 20 in place on a blade when desired. A threaded opening on the blade is provided to receive the bolt 28. For convenience, the threaded bolt 28 is rotatively mounted in the flange side 24 to be quickly available to mount a self-contained light unit 20 (see FIG. 3). A snap ring 33 clips around a necked-down portion on threaded bolt 28 and fits in a recess in the outer surface 23 to prevent interference with installation. The head of the bolt 28 has a recess to receive an Allen wrench. Other shaped recesses can be used.

A cylindrical compartment 30 is fixedly positioned in the angled corner formed by the sides 24 and 26. The cylindrical compartment 30 is sized to receive a battery. A spring 31 is located in a closed end of the cylindrical compartment 30 for acting against the battery, while the other end has a closure member 32 for maintaining a battery in the cylindrical compartment 30. Closure member 32 has contact with one terminal of the battery. The closed end has an opening on the side to receive a conduit 50 for the other terminal of the battery, said conduit 50 having a contact being pressed by the spring 31 against this other terminal of the battery. The outer face of the closure member 32 has a recess to receive an Allen wrench to turn it.

The side 26, extending downwardly from the blade, when mounted, has a light device 36 and switch 38 fixed therein. The bulb 40 of the light device 36 appears on the outer surface 34 along with the toggle 42 of the switch 38. The body 46 of the light device 36 projects rearwardly from the side 26, as does the switch body 44.

The electric circuitry of the self-contained light unit 20 includes said conduit 50 connecting one terminal of the battery to one terminal on the switch body 44. Another conduit 51 connects another terminal 52 on the switch body 44 with one terminal on the body 46 of the light device 36. A conduit 54 connects a second terminal on the body 46 of the light device 36 with the other terminal of the battery, through the housing 22 and closure member 32 of cylindrical compartment 30.

Assuming you have a three-bladed helicopter, and it needs to have the blades tracked, the following should be done in a properly lit area in which the lights can be easily seen:

1. Install a self-contained light unit 20 on each blade with each unit having a different colored bulb 40, as described above;
2. Switch "ON" the three self-contained light units 20;
3. Start engine and engage power and throttle up to full power; use controls to come to a hover;
4. Observe lights from the cockpit; note if there is more than one ring of light;
   a. Perfect tracking will show one multi-colored ring of light;
   b. If one blade is out of track, a ring of the color of the self-contained light unit on that blade will show above, or below, the multi-colored ring remaining of the two other colors;

To properly bring one blade out of track into track, the length of the pitch control link 14 of that blade is adjusted and Steps (3) and (4) are repeated until the blade comes into track, showing one multi-colored ring of light of the three colors.

c. If all three blades are out of track, the observer will see three rings of the different colors of the self-contained light units 20; an upper ring, a mid-ring, and a lower ring. To bring three blades out of track into track with each other, the length of the pitch control link 14 of the blade making the upper ring of color is adjusted to bring that blade downwardly and Steps (3) and (4) repeated until the blade comes into track with the blade forming the mid-ring; then the length of the pitch control link 14 of the blade making the lower ring of color is adjusted to bring that blade upwardly and Steps (3) and (4) repeated until the blade comes into track with the ring formed by the other two blades.

In the event you have more than three blades, you can track four or five blades by using one or two more self-contained light units 20.

In a four-bladed helicopter, if the one extra light unit 20 is the same color as one of the three light units 20 being used, three blades can be tracked first with the red, green and yellow lights and all put in track; for the extra blade, if a green light is used, the first green light could be turned off with the second green light turned on and used to place that fourth blade in track with the three others.

In a five-bladed helicopter, if the two extra light units 20 are the same color as two of the three light units 20 being used, the blades can be tracked first with the red, green and yellow lights and all put in track; for the extra two blades, the first green and yellow light can be turned off and the second green and yellow lights on the two extra blades turned on and used to place that fourth and fifth blade in track with the three others.

A matched set of self-contained light units 20 can be used to track blades on many of the helicopters flying today including the following helicopters: A Star AS 350; Twin Star AS 355; Jet Ranger 206; Long Ranger; Enstrom; Hughes Schweizer (269-300), and Bell 47.

In a matched set of three (3) self-contained light units 20 made, the units were of the same construction and each weighed approximately 38 grams, and the sides 24 and 26 were approximately 3 cm. in length while they were approximately 4½ cm. in width. The light device 36 was an LED having a 370 ohm resistor. Any structural difference between light units 20 should not affect the dynamic forces on the blades in rotation.

In the event one of the light units 20 becomes inoperative while tracking a three-bladed helicopter, the two blades with the working light units 20 can be used to track those two blades and place them in track, then the inoperative light unit 20 can be interchanged with one of the working light units 20 and the third blade can be tracked with the ring of light on the one blade of the first two tracked blades, and placed in track. This is due to the matched size and weight of the self-contained light units 20. The inoperative light unit becomes a "dummy" unit, maintaining dynamic balance between the blades.

After the blades of a three-bladed helicopter have been placed into track, forming a multi-colored ring, for fine tuning, the following steps are taken:

(1) Leave the blade with the most intensive colored light alone;
(2) Adjust another blade on one side by lengthening the pitch control link one-half turn;
(3) Adjust the remaining blade by shortening the pitch control link one-half turn;
(4) "Run up" the engine and come to a hover to observe the distance between the three rings of light now formed by the three blades;
(5) The top ring of light and the bottom ring of light should be of equal distance from the ring of light of the blade not adjusted; however, the top ring of light and the bottom ring of light are now brought back into track with the center ring of light. This adjustment usually requires a turn of more or less khan the original one-half turn and this extra adjustment usually results in a finer tuning and smoother flight. The usefulness of this extra adjustment results because the precise formation of a single multi-colored ring formed by more than two rings can be difficult to arrive at considering the varying intensity of the lights and the varying lightness of the area being used to track the blades.

While the principles of the invention have now been made clear in an illustrative embodiment, it will become obvious to those skilled in the art that many modifications in arrangement are possible without departing from those principles. The appended claims are, therefore, intended to cover and embrace any such modifications, within the limits of the true spirit and scope of the invention.

I claim:

1. A helicopter blade tracking system including a similar self-contained light unit on each rotor blade, each rotor blade having a tip, each self-contained light unit being matched in size and weight, means fixing each unit adjacent the tip of the blade, each self-contained matched light unit having a light device directed radially inward from the tip of the blade, each light device having a different colored light.

2. A combination as set forth in claim 1 wherein each light device of each light unit forms a ring of light of its colored light directed radially inward when said blades are rotated.

3. A helicopter having blades mounted thereon for providing flight for the helicopter, each blade having a tip, means for rotating said blades, means for changing the relative angular position of one blade to the remainder of the blades, said helicopter having a blade tracking system including a like self-contained light unit on each rotor blade, each self-contained light unit being matched in size and weight, means fixing each unit under the blade adjacent the tip of the blade, each self-contained light unit having a light bulb directed radially inward from the tip of the blade, each light bulb of each self-contained light unit producing a different color.

4. A combination as set forth in claim 3 wherein said light devices each include an LED.

5. A combination as set forth in claim 3 wherein each light device has an on-off switch.

6. A combination as set forth in claim 5 wherein each on-off switch is located on its self-contained light unit, and said on-off switches being manually operated when said blades are stationary.

7. A method of tracking two blades on a helicopter which includes:
   (1) placing a different colored light at the tip of each blade;
   (2) rotating said blades forming a ring of light of the color of the colored light of each blade;
   (3) placing said blades in a hover position;
      a. observing the rings of light; if a single ring of a multi-colored light appears, then the blades are in track;
      b. observing the rings of light; if two separate rings of light appear having the colors of the colored light on each blade, then the blades are out-of-track;
   (4) changing the pitch of one blade relative to the other;
   (5) rotating said blades to see if a single ring of a multi-colored light appears; if it does, then the blades are in track;
   (6) if two separate rings of light still appear, repeating steps (4) and (5) until a single ring of a multi-colored light appears, then the blades are in track.

8. A method of tracking three blades on a three-bladed helicopter by a single operator which includes:
   (1) Placing a different colored light at the tip of each blade directed radially inward;
   (2) rotating said blades forming a ring of light of the color of the colored light of each blade;
   (3) Placing said blades in a hover position;
      a. Observing the rings of light; if a single ring of a multi-colored light of the three lights appears, then the blades are all in track;
      b. Observing the rings of light; if three separate rings of light appear, a bottom ring, a middle ring and a top ring, then the blades are all out-of-track;
      c. Observing the rings of light; if two rings of light appear, one ring having the color of one colored light on one blade, and one ring of a multi-colored light of the colors from the other two blades, then one blade is out-of-track;
   (4) If Step (3) b. occurs:
   (5) Change the pitch of two blades;
   (6) Rotate said blades to see if a single ring of multi-colored light of the three lights appears; if it does, then the blades are all in track;
   (7) If three separate rings of light still appear, repeat Steps (5) and (6) until a single ring of a multi-colored light of the three lights appears, then the blades are in track;
   (8) If Step (3) c. occurs,
   (9) Change the pitch of the blade forming the one ring having the color of one colored light;
   (10) Rotate said blades to see if a single ring of multi-colored light of the three lights appears; if it does, then the blades are all in track.

9. A method of tracking three blades on a three-bladed helicopter by a single operator which includes:
   (1) Placing a different colored light at the tip of each blade directed radially inward;
   (2) Rotating said blades to form a ring of light of the color of the colored light of each blade;
   (3) Placing said blades in a hover position;
      a. Observing the rings of light; one light is inoperative to form a ring of light;
   (4) Change the pitch of one blade having an operating light;
   (5) Rotate the blades to see if a single ring of multi-colored light of the two operating lights appears; if it does, then these two blades are in track;
   (6) If two separate rings of light still appear, repeat Steps (4) and (5) until a single ring of multi-colored light of the two operating lights appears:
   (7) Change the inoperative light with an operating light;
   (8 Rotate the blades to see If a single ring of multi-colored light of the two operating lights appears; if it does, then these two blades are in track;
   (9) If two separate rings of light still appear, repeat Steps (4) and (5) until a single ring of multi-colored light of the two operating lights appears; then the three blades are in track.

10. A system on a helicopter for use in tracking two rotor blades, a rotor head mounted for rotation about a center, two helicopter blades having a longitudinal axis, each blade having means pivotally mounting said blade about its longitudinal axis to said rotor head, a first self-contained light unit, said first self-contained light unit being located on one rotor blade, means fixing said first self-contained light unit on said one rotor blade at a predetermined radial distance X from the center of said rotor head, a second self-contained light unit constructed as said first self-contained light unit, said second self-contained light unit being located on the other rotor blade, means fixing said second self-contained light unit on said other rotor blade at the same predetermined radial distance X from the center of said rotor head, said first self-contained light unit emitting a light being of one color, said second self-contained light unit emitting a light being of another color, said self-contained light units being the same in size and weight, wherein each self-contained light unit has an angular housing, said angular housing having two sides set at an angle to each other, the outer surface on one side being fixed to a blade, the other side extending downwardly when mounted, each self-contained light unit having a light device of a different color, each light device being positioned on the other side of said housing extending downwardly to direct its light radially inward, said self-contained light unit having an on-off switch for said light device.

11. A system as set forth in claim 10 wherein each light device forms a ring of light of its colored light when said blades are rotated.

12. A method of tracking blades on a helicopter to determine if they are in track which includes:

(1) placing a different colored light directed radially inward at the tip of each blade;

(2) rotating said blades forming a ring of light of the color of the colored light of each blade;

(3) placing said blades in a hover position;

(4) a. observing the rings of light; if a single ring of a multi-colored light appears, then the blades are in track;

b. observing the rings of light; if a plurality of separate rings of light appear, then the blades are out-of-track.

13. A method of tracking blades on a helicopter which includes:

(1) placing a different colored light directed inwardly at the tip of each blade;

(2) rotating said blades forming a ring of light of the color of the colored light of each blade;

(3) placing said blades in a hover position;

(4) a. observing the rings of light; if a single ring of a multi-colored light appears, then the blades are in track;

b. observing the rings of light; if a plurality of separate rings of light appear, then the blades are out-of-track;

(5) if a plurality of separate rings of light appear, changing the pitch of one blade of said plurality of separate rings of light to bring blades in track;

(6) rotating said blades to see if a single ring of a multi-colored light appears; if it does, then the blades are in track;

(7) if a plurality of separate rings of light still appear, repeating steps (5) and (6) until a single ring of a multi-colored light appears, then the blades are in track.

14. A system on a helicopter for use in tracking two rotor blades, a rotor head mounted for rotation about a center, two helicopter blades having a longitudinal axis, each blade having means pivotally mounting said blade about its longitudinal axis to said rotor head, a first self-contained light unit, said first self-contained light unit being located on one rotor blade, means fixing said first self-contained light unit on said one rotor blade at a predetermined radial distance X from the center of said rotor head, a second self-contained light unit constructed as said first self-contained light unit, said second self-contained light unit being located on the other rotor blade, means fixing said second self-contained light unit on said other rotor blade at the same predetermined radial distance X from the center of said rotor head, said first self-contained light unit having a first light bulb emitting a light being of one color, said second self-contained light unit having a second light bulb emitting a light being of another color, said self-contained light units being the same in size and weight, each self-contained light unit having a housing, said housing having two sides set at an angle to each other, the outer surface on one side being fixed to a blade, the other side extending downwardly and facing inwardly when mounted, each light bulb being positioned on the side of said housing extending downwardly to direct its light inwardly.

15. A combination as set forth in claim 14 wherein each light bulb forms a ring of light directed radially inward of its colored light when said blades are rotated.

16. A combination as set forth in claim 14 wherein each self-contained light unit has an on-off switch for said light device.

* * * * *